Patented Dec. 2, 1947

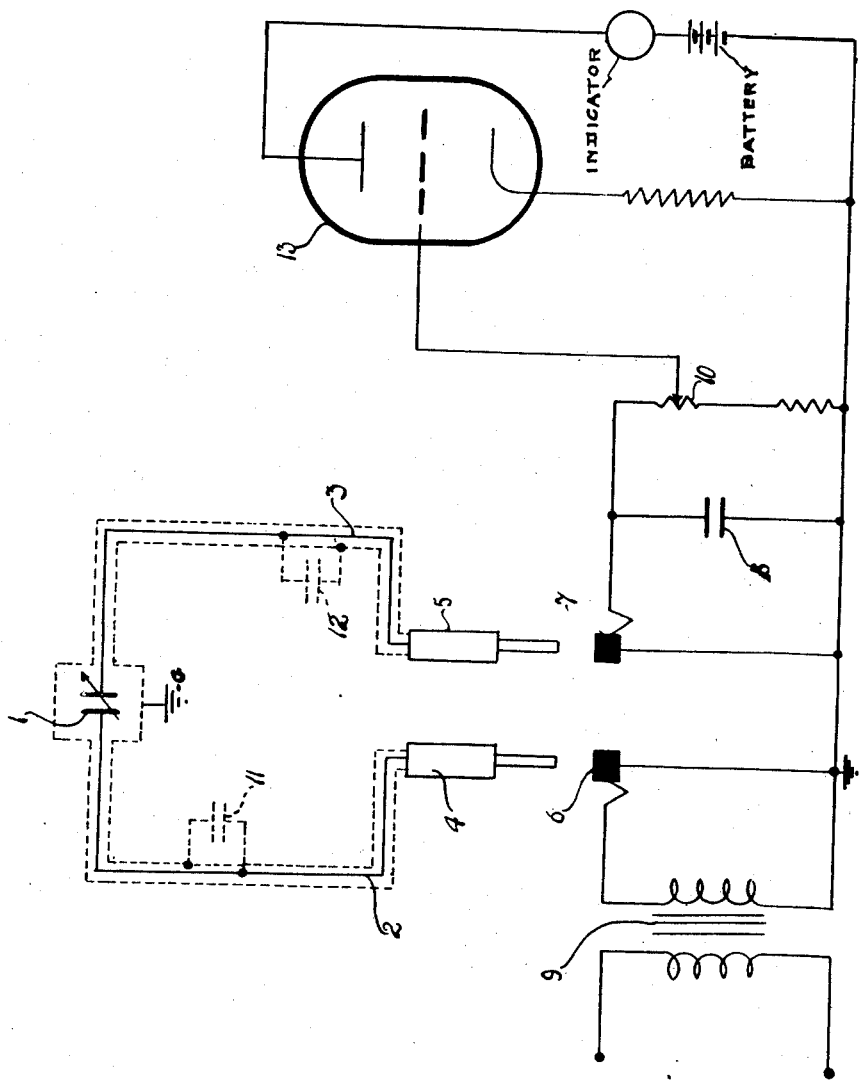

2,431,841

UNITED STATES PATENT OFFICE 2,431,841

APPARATUS FOR MEASURING RELATIVE DISPLACEMENT OR THE THICKNESSES OF MATERIALS

André Willem Storm, Sydney, New South Wales, Australia, assignor to Hartford National Bank & Trust Company, Hartford, Conn., as trustee Application October 12, 1945, Serial No. 621,984
In Australia June 8, 1944

3 Claims. (Cl. 177—351)

It is frequently necessary to measure the relative displacement resulting from the movement of two objects and a common method of making such measurement is to attach the plates of a condenser to the two objects, and to measure the change in capacity which occurs when the movement takes place.

When this method of measurement is adopted, however, difficulties arise because of the existence of stray capacities such as capacity between the conductors connecting the measuring apparatus to the condenser. If a flexible shielded cable is employed to connect the measuring device and the condenser, the stray capacities that exist between the metallic shield and the conductors also give rise to difficulties.

These difficulties are so serious that it is frequently necessary to locate the portion of the apparatus which is most affected by these stray capacities on one of the objects but this introduces new difficulties due to the possibility of mechanical shocks and vibration caused by the movement of the object.

It is the object of this invention to provide apparatus for the measurement of the relative displacement between two objects in which difficulties due to capacities of the foregoing character are minimized.

Reference will now be made to the accompanying drawing which shows the circuit diagram of a preferred embodiment of the invention.

In the diagram the reference numeral 1 indicates a measuring condenser which is preferably of the variable tubular plate type, the capacity of the condenser varying in accordance with the amount of the overlap of the plates. The plates are adapted to be secured to the objects whose relative displacement is to be observed.

The plates of the condenser 1 are also adapted to be connected in circuit with the other parts of the apparatus by means of shielded flexible cables 2 and 3 and plugs 4 and 5 which may be inserted in the jacks 6 and 7.

Connected in series with the condenser 1 is a condenser 8 of relatively large capacity and an alternating voltage may be applied to the circuit comprising condensers 1 and 8 by means of transformer 9, the primary of which is connected to a source of alternating voltage such as a vacuum tube oscillator.

A potentiometer 10 is connected in parallel with the condenser 8 and the voltage appearing across the condenser 8 is applied to the grid of a vacuum tube 13 which may be the first amplifying tube of an amplifier of normal construction.

It will be apparent that as the conductors 2 and 3 are usually of considerable length, a capacity will exist between them. Furthermore a capacity will exist between each conductor and its associated metallic shield. In the drawing the shields, and the capacities between the conductors and the shields, are shown in dotted lines, the capacities being indicated by the reference numerals 11 and 12. These capacities are of a magnitude which is comparable with the capacity of condenser 1.

In the operation of the invention an alternating voltage from a suitable oscillator is applied to the series circuit comprising the condensers 1 and 8 by means of the transformer 9.

The current flowing through the series circuit is dependent upon the voltage applied to the circuit and the impedance of the circuit. The impedance is determined, in the main, by the reactance of the condenser 1 and therefore any variation in the capacity of this condenser caused by the displacement of the objects connected to the condenser plates results in a change in the current flowing in the circuit. This change in current will cause a change in the voltage across condenser 8.

The voltage across the condenser 8 is applied to the tube 13 via the potentiometer 10, and may then be amplified, rectified and utilized to actuate an indicating instrument such as an electrical bridge.

It will be appreciated from the foregoing that the variation in the voltage across condenser 8 caused by the movement of the objects is utilized to actuate indicating means instead of the variation in the voltage across the condenser 1. Since the capacity of the condenser 8 may be made large in comparison with the capacity between the conductors 2 and 3 and the capacities 11 and 12 and furthermore, as the capacities 11 and 12 are in parallel with the condenser 8 if the shielding surrounding the conductors 2 and 3 is connected to earth in accordance with usual practice, the effect of these capacities is greatly reduced.

It is to be understood that the invention may also be used to measure the thickness of a material by rigidly mounting one element of the condenser 1 and using the material to displace the other element from a reference position.

Having now described my invention, what I claim as new and desire to secure by Letters Patent is:

1. In apparatus for measuring relative displacement between movable objects or the thicknesses of materials including a measuring condenser, means for minimizing the effect of stray capacities introduced by the leads connecting the measuring condenser in circuit, comprising an auxiliary condenser of large capacity as compared with the stray capacities, connected in series with the measuring condenser, and in parallel with the stray capacities from the conductors to the shielding; a source of alternating voltage for the series circuit including the measuring condenser and the auxiliary condenser; and means measuring the voltage across the auxiliary condenser.

2. In apparatus for measuring relative displacement between movable objects, the combination with a measuring condenser responsive to such displacement, a testing circuit for the measuring condenser, and conductors from the measuring condenser to the testing circuit with grounded shielding around the conductors and the condenser; of an auxiliary condenser in series with the measuring condenser and in parallel with stray capacities from the conductors to the grounded shielding; a source of alternating voltage for the series circuit; and means responsive to the voltage drop across the auxiliary condenser, that condenser being of large capacity relative to the strap capacities.

3. In apparatus for measuring a dimension corresponding to the thickness of a material, the combination with a measuring condenser movable to a position corresponding to such thickness, a testing circuit for the measuring condenser, and conductors from the measuring condenser to the testing circuit with grounded shielding around the conductors and the condenser; of an auxiliary condenser in series with the measuring condenser and in parallel with stray capacities from the conductors to the grounded shielding; a source of alternating voltage for the series circuit; and means responsive to the voltage drop across the auxiliary condenser, that condenser being of large capacity relative to the stray capacities.

ANDRÉ WILLEM STORM.

REFERENCES CITED

The following references are of record in the file of this patent:

UNITED STATES PATENTS

| Number | Name | Date |
|---|---|---|
| 2,001,096 | Flanders | May 14, 1935 |
| 2,178,471 | De Bruin | Oct. 31, 1939 |
| 2,381,155 | Frommer | Aug. 7, 1945 |

FOREIGN PATENTS

| Number | Country | Date |
|---|---|---|
| 481,103 | Great Britain | Feb. 28, 1938 |